United States Patent
Lee et al.

(10) Patent No.: US 11,888,168 B2
(45) Date of Patent: Jan. 30, 2024

(54) BATTERY MODULE AND MANUFACTURING METHOD THEREOF (71) Applicant: LG CHEM, LTD., Seoul (KR)

(72) Inventors: Youngho Lee, Daejeon (KR); Sung Dae Kim, Daejeon (KR); Junyeob Seong, Daejeon (KR); Junkyu Park, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 542 days.

(21) Appl. No.: 15/734,488

(22) PCT Filed: Mar. 9, 2020

(86) PCT No.: PCT/KR2020/003225
§ 371 (c)(1),
(2) Date: Dec. 2, 2020

(87) PCT Pub. No.: WO2020/251140
PCT Pub. Date: Dec. 17, 2020

(65) Prior Publication Data
US 2021/0320362 A1 Oct. 14, 2021

(30) Foreign Application Priority Data
Jun. 14, 2019 (KR) .................. 10-2019-0070976

(51) Int. Cl.
H01M 50/211 (2021.01)
H01M 50/244 (2021.01)
(Continued)

(52) U.S. Cl.
CPC ....... H01M 50/211 (2021.01); H01M 50/224 (2021.01); H01M 50/244 (2021.01);
(Continued)

(58) Field of Classification Search
None
See application file for complete search history.

(56) References Cited

U.S. PATENT DOCUMENTS 10,224,583 B2    3/2019  Kim et al.
2013/0022859 A1*  1/2013  Lim ............... H01M 10/0525
                                                    429/159
(Continued)

FOREIGN PATENT DOCUMENTS

CN    101689687 A    3/2010
CN    103296230 A    9/2013
(Continued)

OTHER PUBLICATIONS

Machine translation of WO-2018030846-A1 (Year: 2018).*

Primary Examiner — Gregg Cantelmo
(74) Attorney, Agent, or Firm — Birch, Stewart, Kolasch & Birch, LLP (57) ABSTRACT Discussed are a battery module and a method of manufacturing the battery module. The battery module includes a battery cell stack in which a plurality of battery cells are stacked; a first frame having a bottom surface and opposite side surfaces respectively covering a lower side surface and opposite side surfaces of the battery cell stack; and a second frame having an upper surface and front and rear surfaces respectively covering an upper side surface and front and rear surfaces of the battery cell stack, wherein the upper surface of the second frame and the front and rear surfaces of the second frame are integrally formed.

16 Claims, 5 Drawing Sheets (51) Int. Cl.
*H01M 50/224* (2021.01)
*H01M 50/271* (2021.01)
*H01M 50/276* (2021.01)

(52) U.S. Cl.
CPC ....... *H01M 50/271* (2021.01); *H01M 50/276* (2021.01); *H01M 2220/20* (2013.01)

(56) References Cited

U.S. PATENT DOCUMENTS

| | | | |
|---|---|---|---|
| 2013/0057074 A1* | 3/2013 | Takano | H01M 10/6551 307/66 |
| 2013/0224547 A1 | 8/2013 | Ahn | |
| 2013/0280577 A1 | 10/2013 | Shin et al. | |
| 2016/0141566 A1 | 5/2016 | Hamada | |
| 2016/0248070 A1 | 8/2016 | Ahn | |
| 2017/0117514 A1 | 4/2017 | Yamada et al. | |
| 2018/0083234 A1* | 3/2018 | Kikuchi | H01M 10/0585 |
| 2018/0138475 A1 | 5/2018 | Seo et al. | |
| 2019/0006647 A1 | 1/2019 | Ryu et al. | |
| 2019/0115614 A1 | 4/2019 | Sakurai | |
| 2019/0131596 A1 | 5/2019 | Yang et al. | |
| 2019/0214615 A1* | 7/2019 | Hilmann | H01M 50/227 |
| 2019/0260099 A1 | 8/2019 | Ju et al. | |
| 2019/0296294 A1 | 9/2019 | Hirschbeck et al. | |
| 2020/0062130 A1 | 2/2020 | Wuensche et al. | |
| 2020/0295321 A1 | 9/2020 | Omura et al. | |

FOREIGN PATENT DOCUMENTS

| | | | |
|---|---|---|---|
| CN | 107706325 A | 2/2018 | |
| JP | 2012-160347 A | 8/2012 | |
| JP | 2019-75281 A | 5/2019 | |
| KR | 10-2013-0126159 A | 11/2013 | |
| KR | 10-2015-0050314 A | 5/2015 | |
| KR | 10-2017-0040638 A | 4/2017 | |
| KR | 10-2018-0018109 A | 2/2018 | |
| KR | 10-2018-0064298 A | 6/2018 | |
| KR | 10-2018-0135701 A | 12/2018 | |
| WO | WO 2015/151869 A1 | 10/2015 | |
| WO | WO 2017/163696 A1 | 9/2017 | |
| WO | WO-2018030846 A1 * | 2/2018 | ............ H01M 10/04 |
| WO | WO 2019/088625 A1 | 5/2019 | |

* cited by examiner

BATTERY MODULE AND MANUFACTURING METHOD THEREOF

CROSS CITATION WITH RELATED APPLICATION(S)

This application claims the benefit of Korean Patent Application No. 10-2019-0070976 filed on Jun. 14, 2019 with the Korean Intellectual Property Office, the disclosure of which is incorporated herein by reference in its entirety.

TECHNICAL FIELD

The present disclosure relates to a battery module and a method for manufacturing the same, and more particularly, to a battery module that simplifies the frame assembling process, and a method for manufacturing the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell, and to configure a battery pack by using at least one of the battery modules and adding other components.

The battery module includes a battery cell stack in which a plurality of battery cells are stacked, and a frame covering the battery cell stack to protect the battery cell stack.

Figure 1:
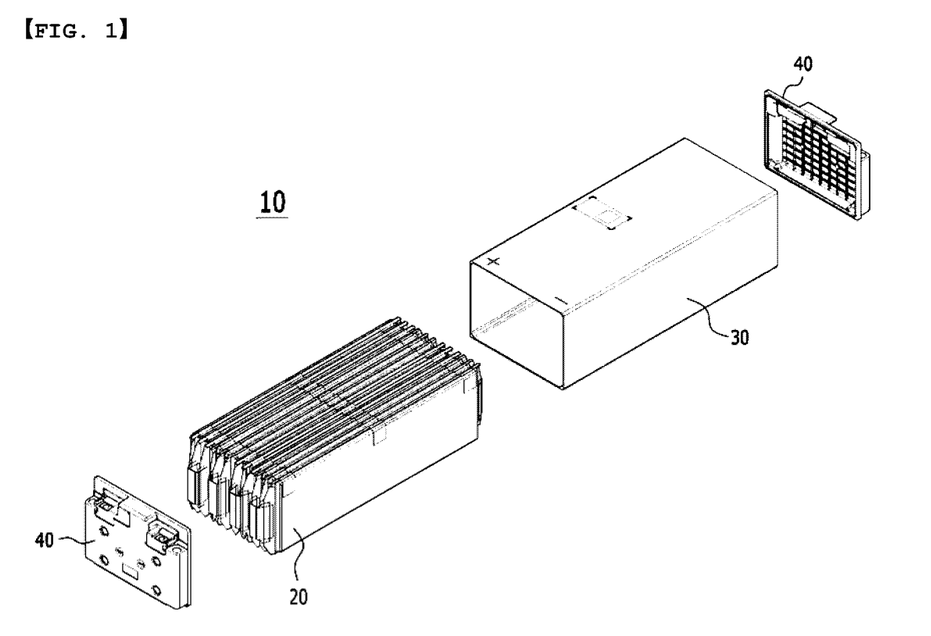
FIG. 1 is an exploded perspective view of a conventional battery module.

FIG. 1 is an exploded perspective view of a conventional battery module 10.

Referring to FIG. 1, the battery module 10 includes a monoframe 30 in which a front surface and a rear surface are opened to accommodate a cell stack 20 in the interior space, and end plates 40 covering the front and rear surfaces of the monoframe 30.

However, in the case of such a monoframe 30, since the cell stack 20 is in the form of being horizontally assembled to the open front or rear surfaces of the monoframe 30, the height of the monoframe 30 should be designed high in consideration of the maximum height of the cell stack 20, the assembly tolerance in the insertion process, etc., and thus, an unnecessarily wasted space is inevitably generated.

Moreover, for the welding of a total of three or more frames, including the monoframe 30 and the two end plates 40, the concept of the welding jig becomes very important, and thus, there is a problem in that continuous management for the jig used during welding is needed.

In addition, when welding three or more frames as above, there may be a case where the gap condition required at the time of welding is not satisfied due to the cumulative tolerances between the frames. Therefore, it is necessary to perform tighter dimension management the frame, and at the same time, there is a problem that the time and cost associated therewith increase.

DETAILED DESCRIPTION OF THE INVENTION

Technical Problem

Therefore, it is an object of the present disclosure to provide a battery module that reduces the number of outer frame parts protecting a battery cell stack, simplifies the frame assembling process and thereby, improves the quality of the battery module, and a method for manufacturing the same.

Technical problems to be solved by the present disclosure are not limited to the aforementioned technical problem, and other technical problems, which are not mentioned above, may be clearly understood from the following descriptions by those skilled in the art to which the present disclosure pertains.

Technical Solution

According to one embodiment of the present disclosure, for realizing the above object, there is provided a battery module comprising: a battery cell stack in which a plurality of battery cells are stacked, a first frame covering a lower side surface and both side surfaces of the battery cell stack, and a second frame covering the upper side surface and the front and rear surfaces of the battery cell stack, wherein the second frame includes an upper surface of the second frame and front and rear surfaces of the second frame, and wherein the upper surface of the second frame and the front and rear surfaces of the second frame are integrally formed.

According to another embodiment of the present disclosure for realizing the above object, there is provided a method of manufacturing a battery module comprising the steps of: manufacturing a first frame formed on a lower surface and both side surfaces, manufacturing a second frame in which an upper surface and front and rear surfaces are integrally formed through a press method, coupling the first frame formed on a lower surface and both side surfaces to a battery cell stack, coupling the second frame formed on an upper side surface and front and rear surfaces to the battery cell stack, and coupling the first frame and the second frame.

The first frame and the second frame may be formed of aluminum.

The first frame and the second frame may be formed of steel.

The upper surface of the second frame and the front and rear surfaces of the second frame may be connected to each other via a frame connecting part.

The frame connecting parts can be formed by two parts on each of the front and rear surfaces of the second frame, and formed to be bent in a vertical direction, thus vertically connecting the front and rear surfaces of the second frame and the upper surface of the second frame.

In the step of coupling the first frame and the second frame, the first frame and the second frame may be mutually coupled by welding.

In the step of coupling the first frame and the second frame, an edge formed in the second frame and an edge of the first frame meeting therewith can be mutually adhered by welding.

After the step of manufacturing the second frame, the method may further include a step of coupling a module mounting part for mounting the battery module to the second frame.

The module mounting part may be adhered by welding to the second frame.

In the step of manufacturing the second frame, a step of forming the front and rear surfaces of the second frame may be further included.

In the step of manufacturing the first frame and the step of manufacturing the second frame, the first and second frames may be formed of aluminum.

In the step of manufacturing the second frame, the frame connecting part formed in the second frame may be bent through a press method to form the upper surface and the front and rear surfaces of the second frame.

In the step of manufacturing the first frame and the step of manufacturing the second frame, the first and second frames may be formed of steel.

Advantageous Effects

The battery module and its manufacturing method according to one embodiment of the present disclosure reduce the number of outer frame parts protecting a battery cell stack to two of the first and second frames, simplifies the frame assembling process, and contributes to the quality improvement of the battery module due to the simplification of the assembling process.

The effects of the present invention are not limited to the effects mentioned above and additional other effects not described above will be clearly understood from the description of the appended claims by those skilled in the art.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, a battery module according to one embodiment of the present disclosure will be described with reference to FIG. 2.

Figure 2:
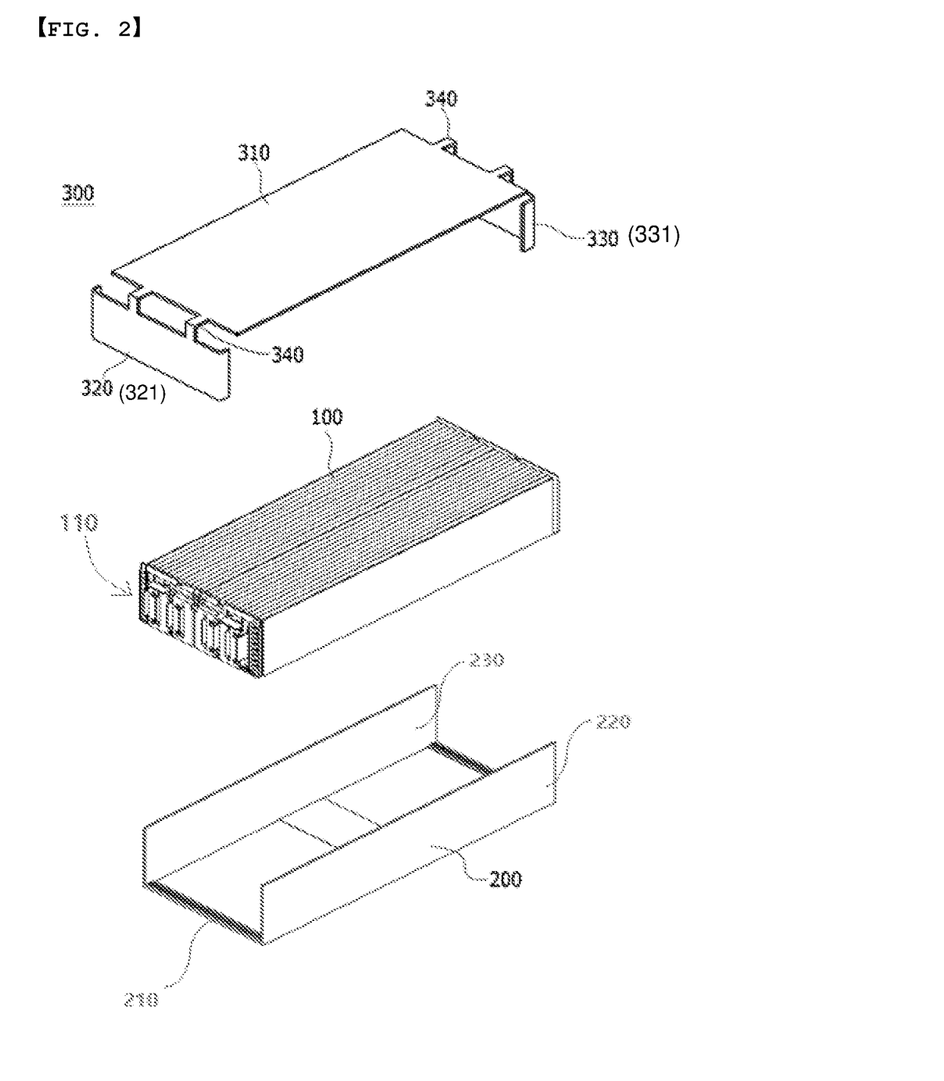
FIG. 2 is an exploded perspective view showing two frames assembled to a battery cell stack according to one embodiment of the present disclosure.

FIG. 2 is an exploded perspective view showing two frames assembled to a battery cell stack according to one embodiment of the present disclosure.

Referring FIG. 2, a battery module according to one embodiment of the present disclosure comprises: a battery cell stack in which a plurality of battery cells 100 are stacked, a first frame 200 in which a bottom surface 210 and both or opposite side surfaces 220 and 230 are formed to cover a lower surface and both side surfaces of the battery cell stack, and a second frame 300 which is formed to have the upper surface and the front and rear surfaces to cover the upper side surface and the front and rear surfaces of the battery cell stack.

The battery cell 100 is a secondary battery, and may be composed of a pouch-type secondary battery. Such battery cells 100 may be configured of a plurality of cells, and the plurality of battery cells 100 may be mutually stacked so as to be electrically connected to each other to form a battery cell stack. Each of the plurality of battery cells may include an electrode assembly, a battery case, and electrode leads protruding from the electrode assembly.

A busbar frame 110 may be formed on each of the front surface and the rear surface of the battery cell stack. The busbar frame 110 includes a busbar and a cell connecting board, and can be formed by covering the front and rear surfaces of the battery cell stack so that the electrode leads of the plurality of battery cells 100 can be electrically connected.

The busbar frames 110 respectively disposed on the front and rear surfaces of the battery cell stack may be electrically connected to each other through a flexible printed circuit board (FPCB) or a flexible flat cable (FFC). Information on the battery cell 100 sensed through FPCB or FFC in this way is transmitted to a battery management system (BMS), wherein in the battery management system, a plurality of battery cells 100 can be controlled and managed a plurality of battery cells 100 on the basis of information on the battery cells 100.

The first frame 200 is formed to cover the bottom surface and both side surfaces of the battery cell 100 stack. Therefore, the battery cell stack can be stably mounted on the first frame 200.

According to one embodiment of the present disclosure, the second frame 300 is configured such that the upper surface and the front and rear surfaces are integrally formed to cover the upper side surface and the front and rear surfaces of the battery cell stack.

Conventionally, in addition to an upper frame covering the upper side surface of the battery cell stack and a lower frame covering the lower side surface and both side surfaces of the battery cell stack, two end frames covering the front and rear surfaces of the battery cell stack are separately assembled. Therefore, when assembling the frames, there were disadvantages in that it is difficult to manage the tolerances for the axial directions of the three axes; the continuous management of the jig used during welding between the frames is needed; and the dimension management of the frame items is made difficult due to the cumulative tolerances between the frames.

However, the second frame 300 according to one embodiment of the present disclosure is configured such that the upper surface and the front and rear surfaces can be integrally formed, thus covering the upper side surface and the front and rear surfaces of the battery cell stack at one time. In this way, the frame parts forming the outer periphery of the battery cell stack are unified into two types of the first and second frames 200 and 300, and thereby, the welding complexity is reduced, the time required for the assembling is reduced and the mass productivity of the product can be secured. In addition, because the welding line is reduced, the probability that defective products are generated due to defective welding is reduced, and the tolerance management site of the frame items is reduced, thereby improving the productivity of the product. Further, management of the product is facilitated due to the reduction in the unit of single item warehousing, and the effect of reducing the cost of the frame parts can also be obtained.

The second frame 300 may include an upper surface 310 of the second frame covering the upper side of the battery cell stack, a front surface 320 of the second frame covering the front direction of the battery cell stack, a rear surface 330 of the second frame covering the rear direction of the battery cell stack, and a frame connecting part 340 connecting the upper surface 310 of the second frame and the front and rear surfaces 320 and 330 of the second frame.

The second frame 300 is manufactured by a press method and may be formed of an aluminum material which can be easily manufactured by the press method. When being manufactured by the press method, pressure is applied to the frame connecting part 340 to bend the frame connecting part 340, and thereby, the front surface 320 of the second frame and the rear surface 330 of the second frame covering the front and rear directions of the battery cell stack can be formed perpendicularly to the upper surface 310 of the second frame so as to correspond to the shape of the battery cell stack.

In the past, the upper frame and the front and rear end frames were separately manufactured, wherein the upper frame was manufactured by an extrusion method, and the end frames were manufactured by a casting method. That is, the frames at each position were manufactured through different methods for each frame. However, in the second frame 300 according to one embodiment of the present disclosure, the upper surface and the front and rear surfaces are manufactured integrally through a press method, and thus, the manufacturing process can be simplified, the manufacturing process management is made easy, and the cost of the product due to the manufacture can be reduced.

In addition, in the past, since the end frame was manufactured by a casting method, the manufactured end frame was a structure having inevitably a certain level of thickness, whereas the second frame 300 of the present disclosure is manufactured by a press method, and thus, it is possible to manufacture the front and rear surfaces 320 and 330 of the second frame having a thickness thinner than the thickness of the end frame manufactured by the casting method. This makes it possible to reduce the volume of the battery module, and increase the energy density of the battery module, which can contribute to the improvement of the mounting property by making the battery module compact.

According to the conventional embodiment, when forming the end frame through the casting method, the basic thickness had to be usually 4.5 mm or more. However, in the second frame 300 according to one embodiment of the present disclosure, the thickness of the front and rear surfaces 320 and 330 of the second frame can allow to reduce to 2 mm through the press method.

Only, there is a problem that as the thickness of the frame becomes thin, the rigidity of the frame may be weakened. However, according to an embodiment of the present disclosure, the front and rear surfaces 320 and 330 of the second frame may be additionally formed so as to correspond to the shape of the electrode lead and busbar frame 110 which are formed on the front and rear surfaces of the battery cell stack, whereby through the forming operation, the rigidity required for the front and rear surfaces 320 and 330 of the second frame can be secured.

The pressed product has a tendency to bend and warp due to its own weight and external loads, and beads are applied to suppress such unintended deformation and reinforce rigidity. The forming is to provide a shape like the beads, and through the forming, a bead-like shape is implemented on the front and rear surfaces of the second frame 320 and 330 to secure rigidity, and at the same time, the bent part formed through the forming and the uneven part of the busbar frame 110 correspond to each other, so that the busbar frame 110 and the battery cell stack can be stably mounted on the second frame 300.

Hereinafter, a method of manufacturing a battery module according to one embodiment of the present disclosure will be described with reference to FIGS. 3 to 5.

Figure 3:
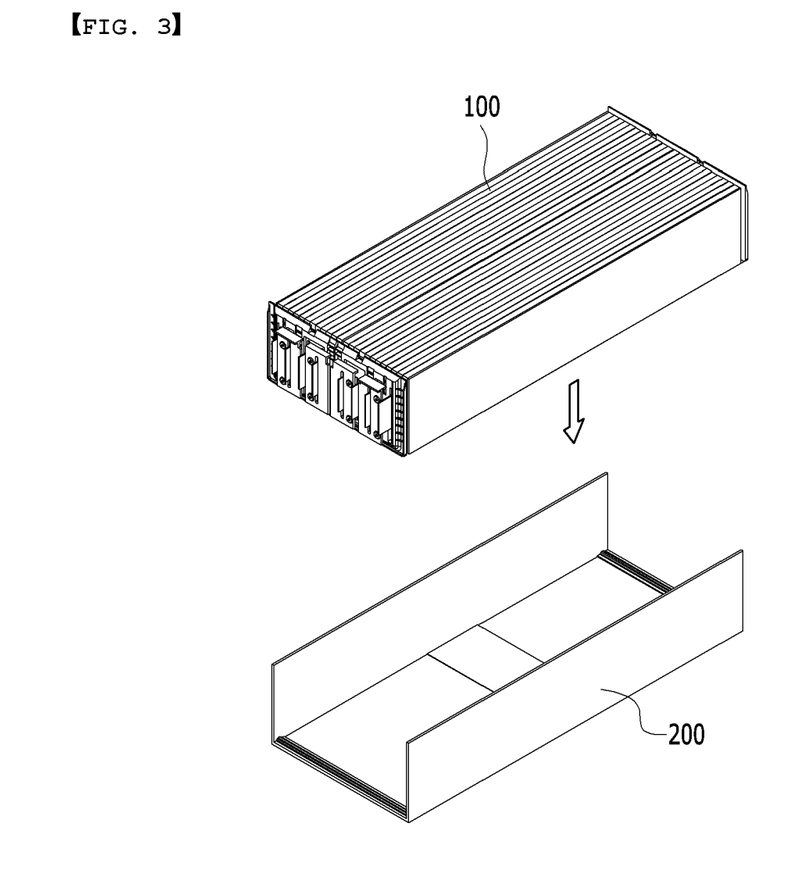
FIG. 3 is a perspective view showing a state in which a battery cell stack is coupled to a first frame according to one embodiment of the present disclosure.

FIG. 3 is a perspective view showing a state in which a battery cell stack is coupled to a first frame according to one embodiment of the present disclosure. FIG. 4 is a perspective view showing a state in which a second frame is coupled to the assembly of FIG. 3. FIG. 5 is a perspective view showing a state in which the assembling of the frames is completed by the coupling of FIG. 4.

Figure 4:
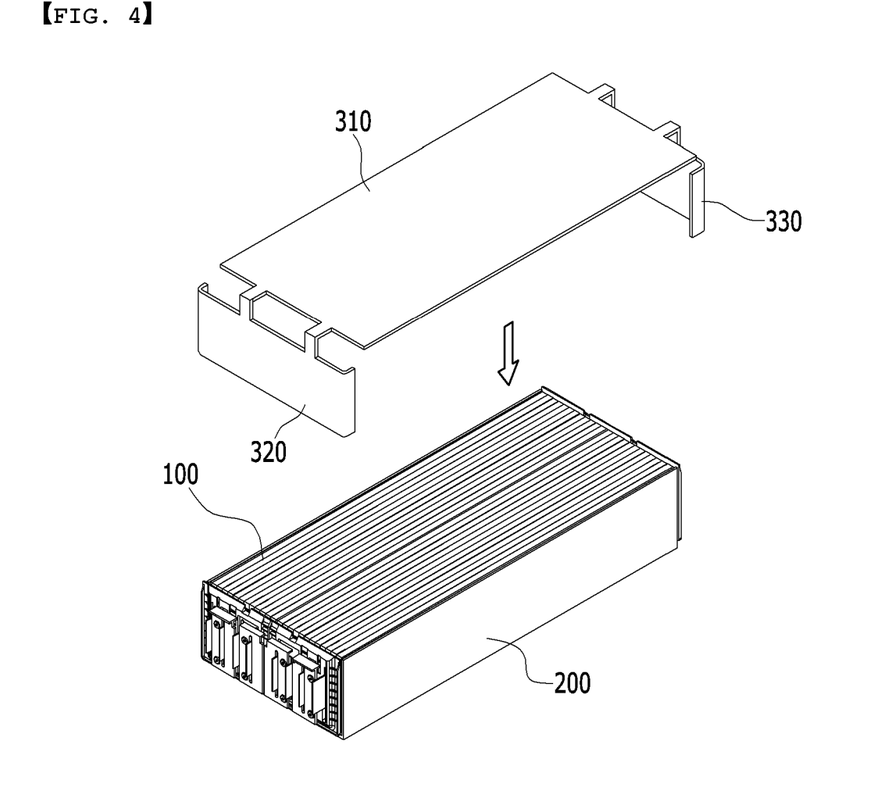
FIG. 4 is a perspective view showing a state in which a second frame is coupled to the assembly of FIG. 3.
Figure 5:
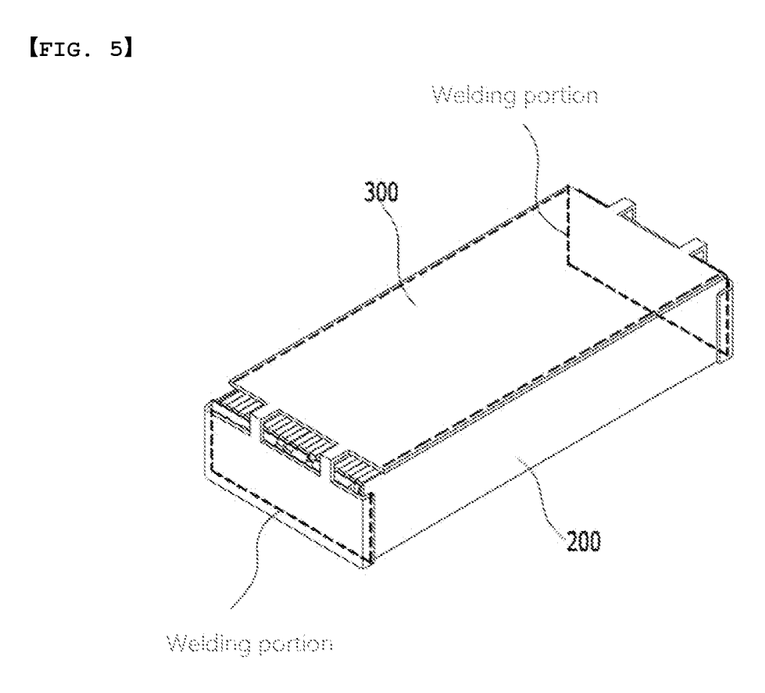
FIG. 5 is a perspective view showing a state in which the assembling of the frames is completed by the coupling of FIG. 4.

Referring to FIGS. 3 to 5, a method of manufacturing a battery module according to one embodiment of the present disclosure performs sequentially the steps of: manufacturing a first frame 200, manufacturing a second frame 300 through a press method, coupling a first frame 200 to a battery cell stack, coupling a second frame 300 to the battery cell stack, and coupling the first frame 200 and the second frame 300.

After the step of manufacturing the second frame 300, a step of coupling a module mounting parts 321 and 331 for mounting the battery module to the second frame 300 may be further included. In this case, the module mounting parts 321 and 331 may be adhered by welding to the upper surface 310 of the second frame 300. The module mounting parts 321 and 331 are welded and coupled to the front and rear sides of the upper surface 310 of the second frame to manufacture all integral-type second frame 300 formed on the upper surface and the front and rear surfaces, which can be coupled to a battery cell stack to assemble a battery module. The module mounting parts 321 and 331 can be simply manufactured as one type of common shape which can be applied to all mounting through extrusion or processing, etc.

In the step of coupling the first frame 200 and the second frame 300, the first frame 200 and the second frame 300 may be mutually adhered by welding. More specifically, as shown in FIG. 5, three edges formed on the front surface 320 of the second frame 300 and the first frame 200 may be mutually adhered by welding at the portions where they meet with each other; and three edges formed on the rear surface 330 of the second frame 300 and the first frame 200 may also be mutually adhered by welding at the portions where they meet with each other.

In the past, the outer structure of the battery cell stack was formed through a lower frame covering the lower side surface and both side surfaces of the battery cell stack, an upper frame covering the upper side surface of the battery cell stack, and end plates covering each of the front and rear surfaces of the battery cell stack, but when welding and assembling the frames having the frame structure as above, three or more parts are gathered and adhered at one vertex, and, therefore, precise welding in the vicinity of a vertex may be made difficult, and since welding was performed in all three axial directions, it is difficult to manage the tolerances of parts for each axial direction at one time.

In addition, for the welding of three or more frames, continuous management of the welding jig was involved, and there was a problem that due to the cumulative tolerance between multiple frames, the gap conditions required during the welding may not be satisfied, and thus, the dimension management s of the frame parts may be made difficult.

However, according to one embodiment of the present disclosure, when assembling the frames, the outer frame structure of the battery cell stack is completed by welding only a total of six edges including three edges of the second frame front surface 320 and three edges of the second frame rear surface 330, and thus, the number of welding between the frames can be reduced compared to the prior art. Further, since the battery module frame structure can be formed of only the two frames of the first and second frames 200 and 300, the frame part management in the manufacturing process is facilitated. In addition, due the reduction in the volume line, it can be easy to satisfy the gap condition between parts required during the welding due to tolerance.

Both the first frame 200 and the second frame 300 may be formed of aluminum. The first frame 200 and the second frame 300 may also be formed of steel.

The battery module as described above may be included in a battery pack. The battery pack may have a structure packed by adding a battery management system (BMS) and a cooling device, etc. which gather one or more of the battery modules according to the present embodiment and manage the temperature or voltage of the battery, etc.

The battery pack comprising the same can be applied to various devices. Such a device may be applied to a vehicle such as an electric bicycle, an electric vehicle, or a hybrid vehicle, but the present disclosure is not limited thereto, and can be applied to various devices capable of using a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

100: battery cell
110: busbar frame
200: first frame
300: second frame
310: upper side surface of the second frame
320: front surface of the second frame
330: rear surface of the second frame
340: frame connecting part

The invention claimed is:

1. A battery module comprising:
a battery cell stack in which a plurality of battery cells are stacked;
a first frame having a bottom surface and opposite side surfaces respectively covering a lower side surface and opposite side surfaces of the battery cell stack; and
a second frame having an upper surface and front and rear surfaces respectively covering an upper side surface and front and rear surfaces of the battery cell stack,
wherein the upper surface of the second frame and the front and rear surfaces of the second frame are integrally formed,
wherein the upper surface of the second frame and the front and rear surfaces of the second frame are connected to each other via at least one frame connecting part,
wherein the at least one frame connecting part is bent in a vertical direction to vertically connect the front and rear surfaces of the second frame and the upper surface of the second frame.

2. The battery module of claim 1, wherein the first frame and the second frame are formed of metal.

3. The battery module of claim 1, wherein the first frame and the second frame are formed of aluminum or steel.

4. The battery module of claim 1, wherein the at least one frame connecting part is formed by two parts on each of the front and rear surfaces of the second frame.

5. A battery pack comprising the battery module according to claim 1.

6. The battery module of claim 1, wherein the upper surface of the second frame is arranged perpendicular to the front and rear surfaces of the second frame, and
wherein the front and rear surfaces of the second frame are arranged parallel to each other.

7. The battery module of claim 1, wherein the first frame and the second frame each cover three surfaces of the battery cell stack.

8. A method of manufacturing a battery module, the method comprising:
manufacturing a first frame having a lower surface and opposite side surfaces;
manufacturing a second frame through a press method;
coupling the first frame to a battery cell stack;
coupling the second frame to the battery cell stack; and
coupling the first frame and the second frame,
wherein in manufacturing the second frame, forming front and rear surfaces of the second frame is further included to integrally form an upper surface and the front and rear surfaces, and at least one frame connecting part formed in the second frame is bent through the press method to form the upper surface and the front and rear surfaces of the second frame, and wherein the at least one frame connecting part is bent in a vertical direction to vertically connect the front and rear surfaces of the second frame and the upper surface of the second frame.

9. The method of claim 8, wherein in coupling the first frame and the second frame, the first frame and the second frame are mutually coupled by welding.

10. The method of claim 9, wherein in coupling the first frame and the second frame, an edge formed in the second frame and an edge of the first frame meeting the formed edge are adhered to each other by welding.

11. The method of claim 8, wherein after manufacturing the second frame, the method further comprises coupling a module mounting part for mounting the battery, module to the second frame.

12. The method of claim 11, wherein the module mounting part is adhered to the second frame through welding.

13. The method of claim 8, wherein in manufacturing the first frame and manufacturing the second frame, the first and second frames are formed of metal.

14. The method of claim 13, wherein in manufacturing the first frame and manufacturing the second frame, the first and second frames are formed of aluminum or steel.

15. The method of claim 8, wherein the upper surface of the second frame is arranged perpendicular to the front and rear surfaces of the second frame, and wherein the front and rear surfaces of the second frame are arranged parallel to each other.

16. The method of claim 8, wherein the first frame and the second frame each cover three surfaces of the battery cell stack.

* * * * *